(No Model.) 2 Sheets—Sheet 1.

N. A. CURRIE.
FERTILIZER DISTRIBUTER.

No. 312,334. Patented Feb. 17, 1885.

Witnesses.
F. W. Lane
J. S. Brown.

Inventor.
Neill A. Currie,
By J. B. Lawyer,
Attorney.

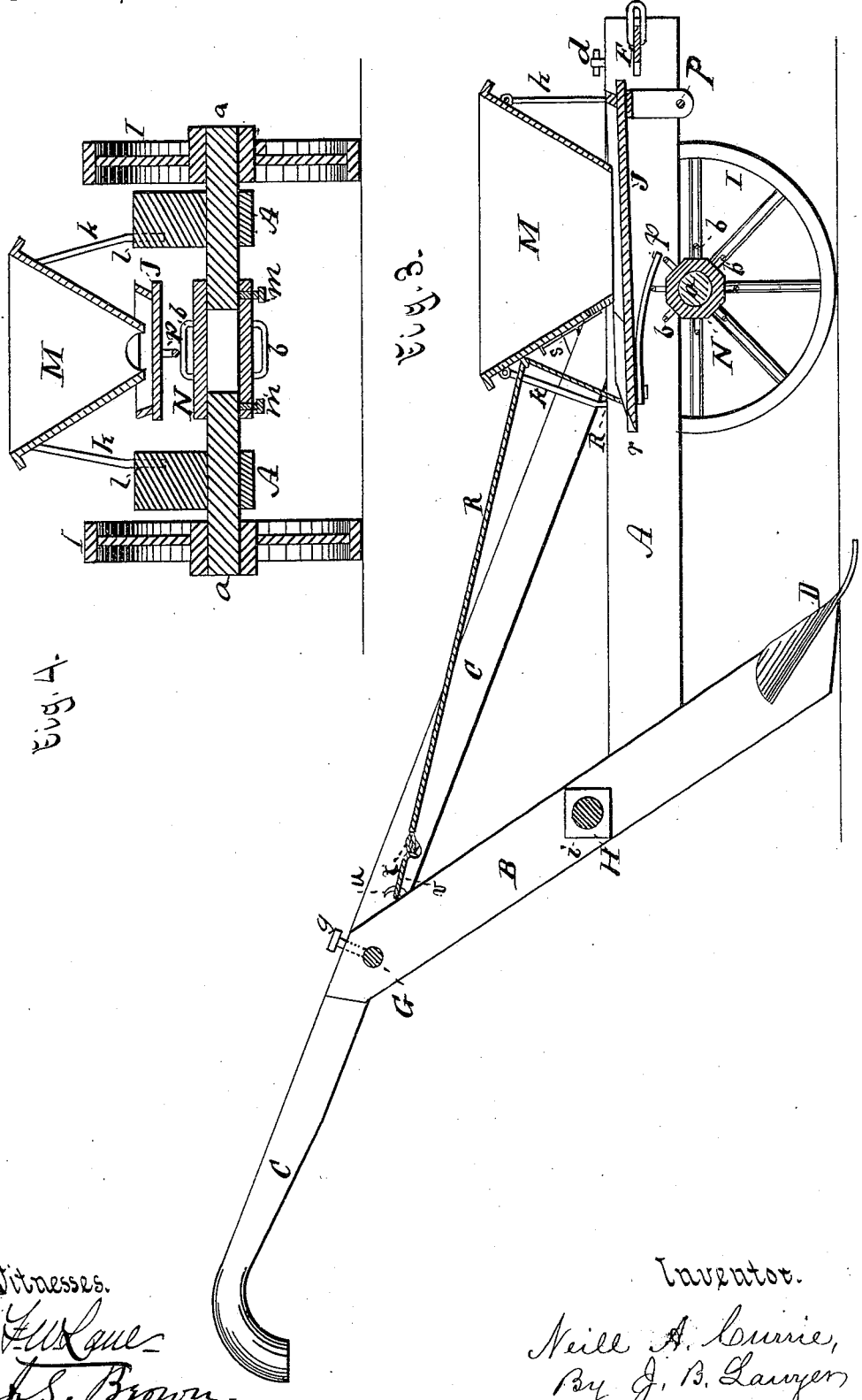

UNITED STATES PATENT OFFICE.

NEILL ALAXANDER CURRIE, OF LAURINBURG, NORTH CAROLINA.

FERTILIZER-DISTRIBUTER.

SPECIFICATION forming part of Letters Patent No. 312,334, dated February 17, 1885.

Application filed September 5, 1883. (No model.)

*To all whom it may concern:*

Be it known that I, NEILL A. CURRIE, a citizen of the United States, residing at Laurinburg, in the county of Richmond and State of North Carolina, have invented certain new and useful Improvements in Fertilizer-Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
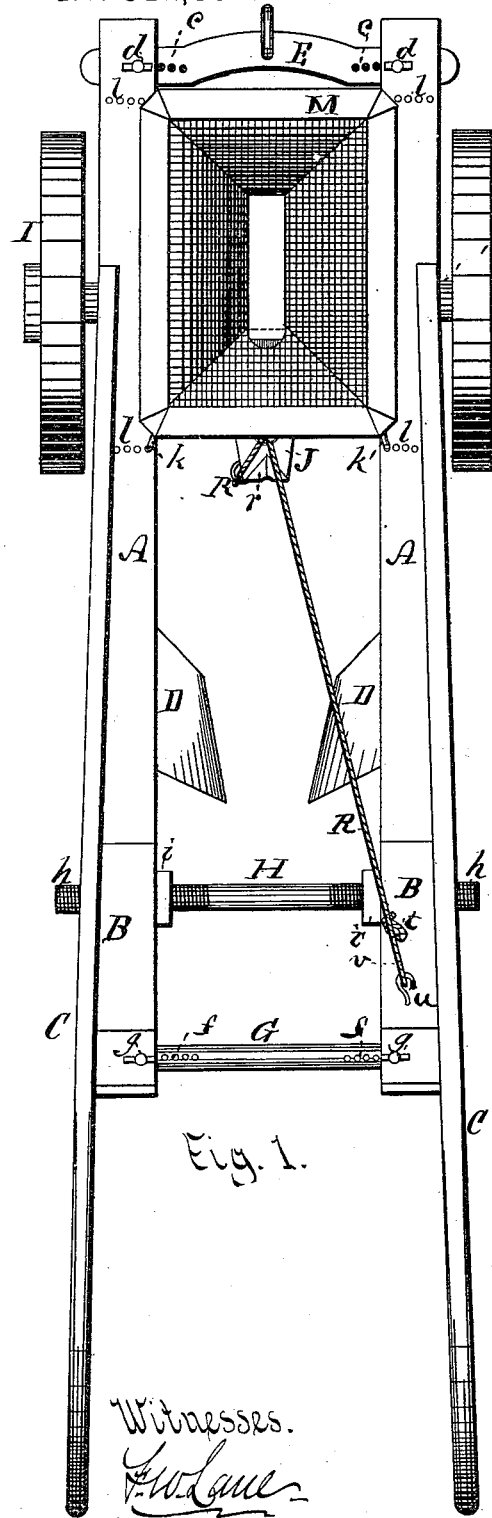
Figure 2:
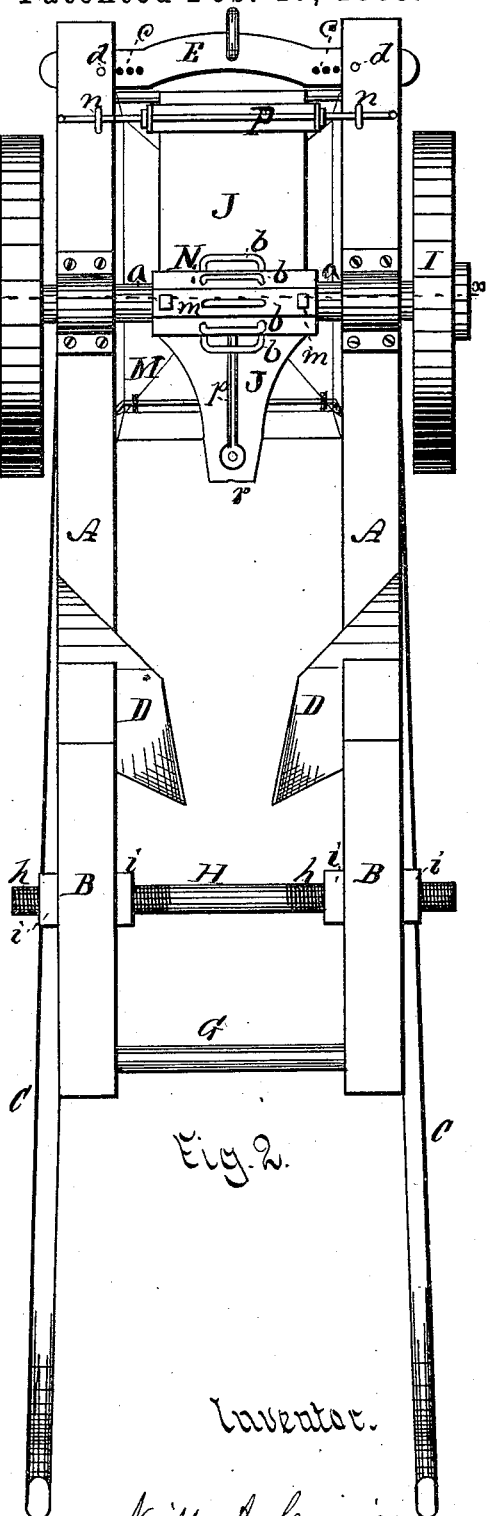

Figure 1 is a top view of the implement; Fig. 2, a view of the under side thereof; Fig. 3, a central longitudinal vertical section; Fig. 4, a section of a part taken in a plane indicated by the line $x\ x$, Fig. 2.

Like letters designate corresponding parts in all of the figures.

My invention consists in an improved implement for distributing guano and other fertilizers, capable also of ridging the land or of casting off ridges, as for preparing land for planting cotton. The features of my invention I will specify in connection with a description of the machine. I employ two parallel beams, A A, and two standards, B B, attached respectively to the rear ends of the beams. The handles C C are supported by the upper ends of the standards and by the beams farther forward. On the lower ends of the respective standards are plows or plow-points D D, arranged, as represented in the drawings, for throwing the earth inward into ridges; or by reversing these plows they will throw the earth outward, and thus serve for casting off previously-formed ridges. The beams are connected at the forward end by a draft-bar, E, and the standards are connected by two rods, G H, one near the upper ends and the other near the beam-connections.

The front part of the implement is supported by two wheels, I I, which also give motion to the distributer J, for vibrating the same under the hopper M. These wheels also make the machine run very lightly and evenly, so that one man and one or two horses can do the work, whereas ordinary fertilizing-distributers require three attendants and never less than two horses. The vibrating or shaking motion is communicated to the distributer J by a revolving shaker, N, on the axle $a$ of the wheels I I. This shaker has a set of projections or teeth, $b\ b$, on its periphery, which are cheaply made of bent wires, as shown, driven into the cylinder forming the body of the shaker, that may thus be made cheaply of wood.

In order that the machine may be expanded or narrowed in width to adapt it to different distances of rows, the following mechanism is adopted: The front or draft bar, E, has a set of holes, $c\ c$, at each end, through any pair of which pins or bolts $d\ d$ pass, and through the beams. Then the upper rod, G, connecting the standards, either has sets of holes $f\ f$ or cavities at proper distances, into which, if holes, bolts or pins $g\ g$ pass, and through the standards, or, if only cavities are in the rod, then set-screws take the place of pins $g\ g$. For the lower rod, H, though similar holes and pins may be used, yet I prefer to use a bolt screw-threaded at $h\ h$ on the two ends, and employ jam-nuts $i\ i$ to screw on the rods close up to the standards on both sides of each. This one screw-rod and nuts thereon serve to give firmness and rigidity to the entire connections. The hopper M is supported on four legs, $k\ k$, the feet of which enter sets of holes $l\ l$, which are respectively arranged at uniform distances in the beams from the outer to the inner sides thereof. The axle $a$ of the wheels is lengthened or shortened by being made in two parts, one for each wheel, and using the shaker N as a coupling for the two parts of the axle, which enters a central hole in the shaker, and the shaker is secured to these parts of the axle in any position by set-screws $m\ m$ therein tightening against the said parts of the axles. The distributer J is pivoted at its front end on a rod, P, which crosses between the beams and is mounted in bearings $n\ n$ on the beam, the rod sliding in the bearings as the instrument is widened or narrowed. On the under side of the distributer I secure a projecting bar, $p$, which rests on the projections $b\ b$, and this bar may be elastic. As the shaker revolves a vibratory motion up and down is communicated to the distributer to cause a distribution of the fertilizer effectually and evenly. The fertilizer is discharged through a spout, $r$, at the rear end of the distributer. The amount of the fertilizer that is permitted to flow back in the distributer into the spout is regulated by a slide, $s$, on the back side of the hopper, and having an adjustable movement up and down on the distributer.

I attach a cord, chain, or other equivalent, R, to the rear end of the distributer and extend it back to one of the standards B B or other part of the machine where the driver can readily reach it. This cord has a loop, $t$, which is caught upon a hook, $u$, on the said standard or other part, and the cord is then of such length as to raise the distributer out of contact with the shaker, and so that the distributer will not then be inclined back. It will then not distribute any fertilizer. When the instrument is required to distribute the fertilizer, the loop $t$ is taken from the hook to let the distributer down upon the shaker.

Another loop, $v$, on the cord, of greater length, may be then caught upon the hook $u$ to keep the cord in position, ready for use.

What I claim as my invention is—

In a fertilizer-distributer, side beams, A A, each provided with two sets of adjusting-holes, $l\ l$, and mechanism, substantially as set forth, whereby the machine is adjusted in width, and the side beams, A A, are brought nearer together, or vice versa, in combination with a hopper, M, provided with legs $k\ k$, which fit in the said adjusting-holes $l\ l$ on the side beams, substantially as set forth.

In testimony whereof I affix my signature in presence of two witnesses.

NEILL ALAXANDER CURRIE.

Witnesses:
   D. STEWART,
   T. J. GILL.